United States Patent [19]

Crooker et al.

[11] Patent Number: 5,256,179
[45] Date of Patent: Oct. 26, 1993

[54] METHOD OF MAKING A GLASS-CERAMIC ARTICLE HAVING AN ADHERENT COLORED GLAZE WITH CONTROLLED TEXTURE

[75] Inventors: David H. Crooker, Corning; Lina M. Echeverria, Erwin, both of N.Y.

[73] Assignee: Corning Incorporated, Corning, N.Y.

[21] Appl. No.: 870,676

[22] Filed: Apr. 17, 1992

[51] Int. Cl.$^5$ .............................................. C03C 25/02
[52] U.S. Cl. ...................................... 65/60.2; 65/60.5; 65/60.8; 65/33; 427/269; 427/376.2; 427/427
[58] Field of Search ............... 65/18.1, 33, 60.2, 60.5, 65/60.8; 427/376.2, 427, 421, 269

[56] References Cited

U.S. PATENT DOCUMENTS

| | | | |
|---|---|---|---|
| 1,600,072 | 9/1926 | Skaupy et al. | 65/60.2 |
| 1,693,252 | 11/1928 | Prouty | 427/376.2 |
| 3,035,937 | 5/1962 | Baldauf et al. | 427/269 |
| 3,086,880 | 4/1963 | Compton | 427/376.2 |
| 3,384,508 | 5/1968 | Bopp et al. | 65/60.8 |
| 3,418,156 | 12/1968 | Medert et al. | 65/60.8 |
| 3,445,266 | 5/1969 | Wittman | 427/427 |

Primary Examiner—Robert L. Lindsay
Attorney, Agent, or Firm—C. S. Janes, Jr.

[57] ABSTRACT

This invention is directed to a method for producing colored glazes having controlled textures, the method comprising the following steps:
(a) a first frit containing a colorant is prepared;
(b) a slip of that frit is applied to a glass-ceramic body and dried;
(c) a second frit either containing another colorant or being colorless is prepared;
(d) a slip of that frit is applied atop the layer of dried particles of the first frit and is dried thereon;
(e) the two layers of frit particles are fused into an integral glaze coating.

19 Claims, No Drawings

METHOD OF MAKING A GLASS-CERAMIC ARTICLE HAVING AN ADHERENT COLORED GLAZE WITH CONTROLLED TEXTURE

BACKGROUND OF THE INVENTION

U.S. application Ser. No. 07/772,216, now, U.S. Pat. No. 5,176,961, filed Oct. 7, 1991 by us under the title COLORED, TEXTURED GLASS-CERAMIC ARTICLES and assigned to the assignee of the present application, now U.S. Pat. No. 5,176,961 observes that, whereas colored glazes certainly add beauty and variation to ceramic articles, there is an inherent sameness in appearance in glaze-coated articles, which sameness is exaggerated in articles having broad surface areas such as large sheets for architectural applications. The premise underlying the disclosure of U.S. Pat. No. 5,176,961 resided in the belief that an improvement in the surface character of a glaze would add another dimension to the aesthetic appearance of glaze-coated articles. Accordingly, the primary objective was to develop a process for producing glass-ceramic articles exhibiting a variegated color, surface textured appearance.

That objective was accomplished through a process involving five general steps:

(a) a batch for a glass having a base composition capable of being converted through heat treatment to a glass-ceramic article and containing a colorant is melted;

(b) that melt is cooled and a colored glass frit prepared therefrom;

(c) a batch for a glass having a base composition essentially the same as the base composition of the glass of Step (a) and, optionally, containing a colorant is melted;

(d) that melt is formed into a desired shape while in the molten state;

(e) particles of colored glass frit are dispersed atop the surface of the molten glass shape;

(f) the molten glass shape is cooled to a solid glass article; and then (g) the solid glass article is heat treated to cause the solid glass article and the colored glass frit particles to crystallize in situ thereby forming a glass-ceramic article having a variegated colored, textured surface.

Such articles exhibit a very striking appearance, combining a wide variety of colors and topical surface effects. However, as can be appreciated from the above outline of the process, the number of steps involved and the high degree of care demanded in carrying out the steps to assure uniformity of product appearance [particularly Step (e)] result in a relatively expensive final product.

Therefore, the underlying objective of the present invention was to devise another method for decorating ceramic articles through the application of glazes which could impart a surface textured appearance, where desired, but which could be more readily controlled to yield products of uniform appearance.

A specific objective was to devise such a method for decorating glass-ceramic architectural cladding members and tableware.

SUMMARY OF THE INVENTION

U.S. Pat. No. 4,467,039 (Beall et al.) and U.S. Pat. No. 4,608,348 (Beall et al.) describe the preparation of glass-ceramic materials suitable for the fabrication of architectural cladding members and consumer dinnerware. Both patents disclose glass-ceramics exhibiting modulus of rupture values in excess of 20,000 psi, coupled with high levels of toughness, resulting from the presence therein of crystals having a chain silicate microstructure.

U.S. Pat. No. 4,467,039 is directed to glass-ceramics containing potassium fluorrichterite as the predominant crystal phase with the sometime presence of canasite as a secondary phase. In the production of dinnerware it is preferred that potassium fluorrichterite constitute the sole crystal phase present. The compositions of the glass-ceramics consist essentially, expressed in terms of weight percent on the oxide basis, of

| $SiO_2$ | 50–70 | $Na_2O$ | 2–9 |
|---|---|---|---|
| CaO | 4–15 | $K_2O$ | 2–12 |
| MgO | 8–25 | $Li_2O$ | 0–3 |
| F | 3–8 | $Al_2O_3$ | 0–7. |

U.S. Pat. No. 4,608,348 is drawn to glass-ceramics containing potassium fluorrichterite as the predominant crystal phase, but also containing at least 10% by volume, and commonly about 20% by volume, of cristobalite. Those glass-ceramics consist essentially, expressed in terms of weight percent on the oxide basis, of

| $SiO_2$ | 65–69 | $Na_2O$ | 1.5–3.3 |
|---|---|---|---|
| $Al_2O_3$ | 0.75–3.5 | $K_2O$ | 4.2–6.0 |
| MgO | 13.5–17.5 | BaO | 0–2.5 |
| CaO | 3–4.8 | $P_2O_5$ | 0–2.5 |
| $Li_2O$ | 0.5–2.0 | F | 3.3–5.5. |

The high strength and toughness of the glass-ceramics disclosed in those two patents, coupled with the relatively easy melting and forming of the precursor glasses therefor, have promoted their utility as architectural cladding members. That is, their high strength and toughness enable them to be used in thinner cross section and in larger surface area members than conventional ceramic materials employed for that purpose. Therefore, the compositions disclosed in those patents constitute the preferred embodiments for architectural cladding materials.

The excellent resistance of those glass-ceramic materials to weak acids and bases along with their high strength and toughness have rendered them ideally suited for the manufacture of dinnerware. Accordingly, the compositions recorded in those patents also constitute the preferred embodiments for that application.

We have found that decorative effects of varying relief, color, and color intensity can be reproducibly produced on glass-ceramic articles, notably architectural cladding members and dinnerware, having compositions within the above two patents through the controlled successive applications onto a surface thereof of at least two glaze compositions atop one another. Inasmuch as the thickness of the glaze layers affects not only the surface relief, but also the color, the pattern of the color, and the intensity of color, the control of thickness is crucial to the process. Therefore, the present invention is based upon controlling the application of the glaze layers during their application to assure glaze layers of reproducible thickness. The appearance of the glazed articles is also dependent upon the method of application. That is, a smooth, uniform coating can be sprayed onto the surface of the article or a granitic, grainy surface appearance can be produced utilizing a spatter gun.

Because the glaze frits are applied through spraying a slip onto the surface of the glass-ceramic, two parameters have been found to be operable in controlling glaze thickness:

(a) total volume applied per unit area; and
(b) application time per unit area.

Both parameters have been demonstrated to be effective in achieving reproducible results. Total volume per unit area comprises the preferred control parameter for smooth, even glazed appearances, whereas application time per unit area is the preferred mode for the development of uneven surface textures.

Control of the pressure applied to the spray delivery line is also advantageous inasmuch as the volume of glaze delivered per unit time is directly related to the pressure applied to the slip. A wide variety of spray pressures has been investigated with pressures generally ranging about 50–100 lbs/in$^2$ ($\sim$3.5–7.0 kg/cm$^2$) have been found to be operable. Pressure plays a very substantial role in the development of uneven surface textures, greatly influencing the color pattern and grainy surface produced. For example, pressures in the region of 70–100 lbs/in$^2$ ($\sim$4.9–7.0 kg/cm$^2$), with 80 pounds being preferred, have been found to be very suitable for the development of glazes exhibiting a granite-like texture, although coarser and finer textures can be prepared at higher and lower pressures, respectively. The coarseness of the texture can also be influenced by the size of the droplets, larger droplets leading to coarser textures. Pressures in the range of 50–70 lbs/in$^2$ ($\sim$3.5–4.9 kg/cm$^2$) have generally yielded smooth, evenly coated glazes. We have determined that, to assure the production of the desired glazes, the thickness of the sprayed slip after drying will vary between 0.004"–0.010" ($\sim$0.1–0.25 mm), and the thickness of the glaze after firing will range between 0.002"–0.005" ($\sim$0.05–0.13 mm).

The use of at least two layers of glazes gives rise to various surface profiles and color textures. For example:

(1) A striated effect can be obtained on ware having sloping surfaces when the application of at least one layer of a colored glaze is followed by the application of a clear glaze thereover. Thus, the down flow of particles of clear frit past particles of colored frit during firing results in alternating colored and clear bands. These striations are especially striking in appearance when the colored glaze is dark, thereby providing the greatest contrast. Beautiful striation effects have been obtained as well when concentric bands of different colored frits are applied along a sloping surface, and both are followed by a clear glaze coating applied thereover. In this case, differently colored frit particles flow past each other yielding striations of alternating colors giving rise to an effect resembling a tiger's eye.

(2) A mottled effect can be achieved by spraying a slip of colored frit particles onto a flat surface of ware, followed by the spraying of a layer of clear frit particles thereover, and then firing the frit particles into a glaze. A mottled effect results when the clear frit particles sink into the colored ones without horizontal gliding. The effect is present in all color glazes, but, as in the previous cases, is more noticeable for dark glazes.

(3) Because glazes experience gravitational run during firing, sculptured ware can be beautifully enhanced by a multilayer glaze application. The glaze runs down from high relief areas and accumulates in low relief areas, thereby highlighting the latter with more intense coloring.

(4) A granite-like texture can be obtained by spraying the surface of ware with relatively large droplets utilizing a spatter gun, followed by a smooth uniform coating of a clear glaze. The spatter gun sprays droplets of slip that impact upon the surface of the article. The droplets form splotches of dried slip that are about 0.5–8 mm in diameter, with the size thereof being determined by the pressure of the spray. Firing results in irregular large, medium, and small splotches of color that resemble grains in granitic rock. In like manner to glazes exhibiting solid colors, the intensity of the areas of various colors can be governed by controlling the thickness of the coatings applied.

Glass-chromic articles are decorated in accordance with the present invention utilizing the nine following general steps:

(1) a first glass displaying a desired color is prepared;

(2) that glass is comminuted into particles of desired sizes (frit);

(3) those particles are blended into a liquid vehicle (preferably water) along with the optional inclusion of dispersants, surfactants, binders, etc., to form a sprayable slurry or slip;

(4) that slip is applied onto a surface of a glass-ceramic article and dried to form a coating having a thickness of about 0.004"–0.010" ($\sim$0.1–0.25 mm);

(5) a second glass having essentially the same basic composition as the first glass but displaying another color or in the clear state is prepared;

(6) that glass is comminuted into particles of desired sizes (frit);

(7) those particles are blended into a liquid vehicle (preferably water) along with the optional inclusion of dispersants, surfactants, binders, etc. to form a sprayable slurry or slip;

(8) that slip is applied onto a surface of a glass-ceramic article over the first deposited coating and dried to form a coating having a thickness of about 0.004"–0.010"; and then (9) at least the area of the glass-ceramic surface having the two-layer coating of frit is fired at a temperature and for a time sufficient to fuse the frit into an integral glaze coating.

We have found that the inclusion of a small amount of sugar in the liquid vehicle is helpful in providing bonding of the dried frit particles to themselves and to the surface of the glass-ceramic article, which typically leads to deeper colors and finer surface quality. Accordingly, the addition of sugar comprises our preferred practice.

The two layers of frit are fused in a single firing, which firing may be carried out on the glass-ceramic article in the crystalline state or, more desirably from an economic point of view, the coatings of frit will be applied to the surface of the precursor glass body and the fusion of frit and the crystallization in situ of the precursor glass body into a glass-ceramic body will be undertaken concurrently.

Where desired, additional coatings of first and second glass frits can be alternately applied and dried, and the resulting several-layer coating of frit then fired to produce an integral glaze coating.

Colorants conventional in the glass art, e.g., the transition metal oxides $Co_3O_4$, $Cr_2O_3$, $CuO$, $Fe_2O_3$, $MnO_2$, NiO, and $V_2O_5$, selenium, and the rare earth metal oxides, can be used in amounts of about 1-7%.

U.S. Pat. No. 4,582,760 (Beall et al.) discloses glazes expressly designed for decorating glass-ceramic articles containing potassium fluorrichterite as the predominant crystal phase; i.e., glass-ceramic articles coming within the disclosures of U.S. Pat. No. 4,467,039 and U.S. Pat. No. 4,608,348, supra. Thus, those glazes demonstrate linear coefficients of thermal expansion (0°-300°) between about $60-70\times10^{-7}$/°C. such that surface compression is developed upon their application to potassium fluorrichterite-containing glass-ceramics which exhibit linear coefficients of thermal expansion (0°-300° C.) between about $80-100\times10^{-7}$/°C. for articles of U.S. Pat. No. 4,467,039 and about $100-14\times10^{-7}$/°C. for articles of U.S. Pat. No. 4,608,348.

Those glazes consist essentially, expressed in terms of weight percent on the oxide basis, of

| $SiO_2$ | 46-50 | $K_2O$ | 1-2 |
|---|---|---|---|
| $Al_2O_3$ | 5-8 | CaO | 1-4 |
| $ZrO_2$ | 0.3-1 | ZnO | 2-6 |
| $Li_2O$ | 1-2 | SrO | 2-6 |
| $Na_2O$ | 2-3.5 | $B_2O_3$ | 9-11. |
| PbO | 20-25 | | |

Whereas those glazes contain a substantial concentration of PbO, the lead release after exposure to weak acids (2-4 hours in 4% acetic acid solution) and weak bases (72 hours in alkaline detergent) does not exceed 1 part per million (ppm). Therefore, those glazes constitute our most preferred PbO-containing glazes.

U.S. Pat. No. 4,814,298 (Nelson et al.) describes lead-free and cadmium-free glazes developed as replacements for the lead-containing glazes disclosed in U.S. Pat. No. 4,582,760, supra. Those glazes consisted essentially, expressed in terms of mole percent on the oxide basis, of

| $SiO_2$ | 55-75 | $Na_2O$ | 3-9 |
|---|---|---|---|
| $B_2O_3$ | 8-13 | $ZrO_2$ | 2-5 |
| $Al_2O_3$ | 0.5-3 | BaO | 0.5-16 | with optionally, up to 12% total of an oxide selected from the group in the indicated proportions of 0-5% $K_2O$, 0-10% $Li_2O$, 0-2% MgO, 0-5% CaO, 0-3% SrO, and 0-2% ZnO. Those glazes exhibited linear coefficients of thermal expansion (25°-300° C.) of $45-90\times10^{-7}$/°C., softening points between 640°-800° C., and viscosities suitable for firing at about 800°-900° C.

U.S. application Ser. No. 07/870,677, filed concurrently herewith by J. M. Nigrin under the title TRANSPARENT LEAD-FREE GLAZES and assigned to the same assignee as the present application, now U.S. Pat. No. 5,204,297 discloses an improvement upon the glazes described in U.S. Pat. No. 4,814,298, supra, i.e., lead-free and cadmium-free glazes particularly designed for coating glass-ceramic articles encompassed within the disclosure of U.S. Pat. No. 4,608,348. The glazes consist essentially, expressed in terms of weight percent on the oxide basis, of

| $SiO_2$ | 51-59 | $Li_2O + Na_2O + K_2O$ | 10-15 |
|---|---|---|---|
| $Al_2O_3$ | 4.5-7 | CaO | 0-7 |
| $B_2O_3$ | 9-12 | SrO | 0-12 |
| $Li_2O$ | 0-2 | BaO | 0-9 |
| $Na_2O$ | 3.5-7 | ZnO | 0-10 |
| $K_2O$ | 6-8.5 | CaO + SrO + BaO + ZnO | 8-18 | with the proviso that the mole ration ($Li_2O+Na_2O+K_2O$):—($CaO+SrO+BaO+ZnO$) is greater than 1.0 and ranges up to about 1.4.

The glazes exhibited linear coefficients of thermal expansion between about $70-85\times10^{-7}$/°C. over the temperature range of 25°-300° C., good flow at temperatures between about 900°-1000° C., and exceptional resistance to attack by acids and bases. Accordingly, those glazes comprise our most preferred PbO-free glazes.

Corning Incorporated, Corning, N.Y., has marketed a glass-ceramic dinnerware as Corning Code 0308 under the trademark SUPREMA ® which is encompassed within U.S. Pat. No. 4,608,348, supra, in that it contains potassium fluorrichterite and cristobalite as the predominant crystal phases and has the following approximate composition, expressed in terms of weight percent on the oxide basis, of

| $SiO_2$ | 66.8 | $K_2O$ | 4.75 | $Sb_2O_3$ | 0.23 |
|---|---|---|---|---|---|
| $Al_2O_3$ | 1.7 | $Na_2O$ | 3.3 | NiO | 0.014 |
| MgO | 14.5 | $Li_2O$ | 0.8 | $Co_3O_4$ | 0.0015 |
| CaO | 4.4 | $P_2O_5$ | 1.15 | $Fe_2O_3$ | 0.02. |
| BaO | 0.21 | F | 3.74 | | |

A most specific objective of the present invention was to develop a method for decorating SUPREMA ® tableware and glass-ceramic architectural cladding members prepared from the same basic composition.

PRIOR ART

U.S. Pat. No. 3,922,458 (Lynch) describes decorating metallic surfaces through the successive application of two different enamels atop one another, the enamels having different melting temperatures. Thus, the method comprised four basic steps:

(1) a slip of a first frit is applied to a metallic surface and dried thereon;

(2) the frit is fired to fuse it to a first coating on the metal surface;

(3) a slip of a second frit having a lower melting temperature is applied atop the area of coated metal and dried; and (4) that frit is fired at a temperature somewhat lower than that of the first firing so that the second frit fuses and reacts with the first coating, the reaction product resulting therefrom exhibiting surface tension in relation to the underlying surface.

At least three fundamental features distinguish the method of the patent from that of the present inventive method.

First, glass frits having significantly different base compositions are used in the patented process, whereas essentially the same base compositions are used in the subject inventive method.

Second, two separate firing steps at different temperatures are employed in the patented method, whereas a single firing step is used in the instant inventive method.

Third, the resultant enamel is under tension with respect to the metal in the practice of the patent, whereas the coating in the present inventive method provides a layer of compression on the glass-ceramic.

U.S. Pat. No. 4,110,487 (Rion) is likewise directed to decorating metallic surfaces through the successive application of two different ceramic coatings atop one another, the frits comprising the two coatings having different melting temperatures. The method involved three basic steps;

(1) a first frit in dry form is applied to the metal;

(2) a second frit having a higher melting temperature than the first frit is applied in dry form atop the area of coated metal; and (3) the coated metal is initially fired to a temperature at which the first frit fuses to form a coating on the metal and the temperature is thereafter raised to fuse the second frit, the resultant combined coating being in neither tension nor compression.

At least four basic factors distinguish the method of the patent from that of the instant inventive method.

First, the composition of the first frit is substantially different from that of the second frit; in contrast, frits of essentially the same base compositions are used in the subject inventive method.

Second, the patent demands that the frits be applied as dry powders, whereas the frits in the present invention are applied in wet form.

Third, although the patent states that a single firing practice is employed, in reality, a two-step procedure is followed, wherein the first frit is initially fused at one temperature and the temperature is then raised to a higher level to fuse the second frit.

Fourth, the glaze is stated to be under neither tension nor compression, whereas the glaze developed in the instant inventive method is required to be under compression with respect to the glass-ceramic.

U.S. Pat. No. 4,394,064 (Dauson) discloses articles, particularly spandrel panels, being decorated and protected from chemical attack through the successive application of a decorative enamel and a transparent protective overcoating. The method comprised four fundamental operations.

First, an enamel frit was applied.

Second, that frit was fired to fuse the frit particles into an integral coating.

Third, the coated body was contacted with an organometallic compound which will thermally decompose to a transparent metal oxide film, a solution of dibutyltin difluoride being the sole cited example.

Fourth, the overcoated body was then fired to pyrolytically deposit the metal oxide film.

At least three substantive features differentiate the method of the patent from that of the subject inventive method.

First, the composition of the second coating, viz., the organometallic compound, is far removed from that of the enamel first coating, whereas frits of essentially the same base composition are utilized in the present inventive method.

Second, two successive firing steps at different temperatures are employed, instead of the single firing in the instant inventive method.

Third, the present inventive method requires successive layers of glazes or enamels, whereas the patent uses one enamel, the overcoat being a metal oxide, not a glass.

DESCRIPTION OF PREFERRED EMBODIMENTS

Table I reports a group of three frit compositions, expressed in terms of parts by weight on the oxide basis, illustrating the present invention. Inasmuch as the sum of the individual components totals or closely approximates 100, for all practical purposes the tabulated values may be deemed to represent weight percent. Because it is not known with which cation(s) the fluoride is combined in the glass and the concentration thereof is relatively small, it is merely reported as fluoride in excess of the base composition in accordance with conventional glass analysis practice. It will be observed that Example 1 comprised a lead-containing frit of the type disclosed in U.S. Pat. No. 4,582,760, supra; Example 2 comprised a lead-free and cadmium-free frit of the type disclosed in U.S. Pat. No. 4,814,298, supra; and Example 3 comprised a lead-free and cadmium-free frit of the type disclosed in Ser. No. 07/870,677, supra. In general, the actual batch ingredients may be any materials, either an oxide or other compound, which, when melted in combination with the other ingredients, will be transformed into the desired oxide in the proper proportions. For example, $Li_2CO_3$, $Na_2CO_3$, $SrCO_3$, and $BaCO_3$ can act as sources of $Li_2O$, $Na_2O$, $SrO$, and $BaO$, respectively. The fluoride component will conveniently be provided through an alkali metal fluoride or silicofluoride.

The batch ingredients were compounded, thoroughly blended together to assist in securing a homogeneous melt, and then charged into platinum or silica crucibles. After placing lids thereon, the crucibles were introduced into a furnace operating at about 1300°–1450° C. and the batches melted therein for 4 hours. The melts were poured as a fine stream into a bath of tap water (that procedure being termed "drigaging" in the glass art) to yield finely-divided particles which were further comminuted through milling to an average particle size of about 15 microns.

|  | 1 | 2 | 3 |
| --- | --- | --- | --- |
| $Li_2O$ | 1.3 | 2.0 | — |
| $Na_2O$ | 2.9 | 5.0 | 6.5 |
| $K_2O$ | 1.3 | 4.5 | 7.4 |
| $SiO_2$ | 48.2 | 54.0 | 57.8 |
| $B_2O_3$ | 9.7 | 12.0 | 11.0 |
| $Al_2O_3$ | 6.3 | 1.5 | 5.8 |
| $ZrO_2$ | 0.8 | 5.0 | — |
| PbO | 21.4 | — | — |
| SrO | 3.4 | — | 3.0 |
| ZnO | 2.7 | — | 8.5 |
| CaO | 1.7 | — | — |
| BaO | — | 14.0 | — |
| $TiO_2$ | — | 2.0 | — |
| F | 0.5 | — | — |

It will be appreciated that the above description represents laboratory activity only and that the glaze compositions are capable of being melted in accordance with commercial glassmaking practice. Thus, it is only necessary that a proper batch composition be formulated, the ingredients be thoroughly mixed together, and the resulting batch be melted for a time and at a temperature suitable for obtaining a homogeneous melt. The melt can then be cooled to a glass and that glass comminuted to a desired particle size. Drigaging was performed as a matter of convenience only.

A slip was prepared composed of 372 grams of powdered frit, 15.6 grams of a ball clay, and 230 ml of distilled water and ballmilled using balls in a jar mill for eight hours. The milled slip was filtered through a No. 100 U.S. Standard Sieve (149 microns) and the specific gravity thereof was adjusted through the addition of water to achieve a specific gravity of 1.52–1.56 g/cm$^3$.

The slip was sprayed onto 10.5" (~26.7 cm) diameter plates of SUPREMA® dinnerware or 4.5"×4.5" (~11.4×11.4 cm) tile having the composition of SUPREMA® dinnerware. For smooth surface glazes, a hand spray gun marketed by Automatic Spray Gun Company, Model 10L, or an air brush, type AUNVFB-O, marketed by Paasche was used. To create a granitic effect, a spatter gun, type MBC, marketed by DeVilbiss was used.

Table II lists a group of colorants, expressed in terms of weight percent, which were added to the batches of the frits set out in Table I, along with the color exhibited by each single or combination addition.

TABLE II

|  | Co₃O₄ | NiO | CuO | Cr₂O₃ | MnO₂ | Fe₂O₃ | V₂O₅ |
| --- | --- | --- | --- | --- | --- | --- | --- |
| (a) Gray | 0.495 | 0.784 | — | 0.196 | — | — | — |
| (b) Steel Gray | 0.495 | 0.98 | — | — | — | — | — |
| (c) Black | 0.88 | 2.44 | — | — | 2.705 | 0.00165 | — |
| (d) Dark Blue | 1.46 | 1.46 | — | — | — | 0.0291 | — |
| (e) Navy Blue | 0.99 | — | — | — | — | — | — |
| (f) Royal Blue | 1.85 | 3.468 | — | — | 0.861 | — | — |
| (g) Aqua Blue | 0.812 | 0.438 | — | 1.388 | — | 0.0087 | — |
| (h) Celadon Blue | — | — | 0.685 | 0.194 | — | — | — |
| (i) Forest Green | 0.952 | 0.952 | 0.952 | — | — | — | 1.90 |
| (j) Brown | — | 0.94 | — | — | 4.85 | — | — |
| (k) Choc. Brown | 0.155 | 1.276 | — | — | 5.078 | — | — |
| (l) Beige | — | 0.299 | — | — | — | — | — |
| (m) Gold | — | 1.96 | — | — | — | — | — |
| (n) Pink | — | — | — | — | 1.96 | — | — |
| (o) Burgundy | — | — | — | — | 5.66 | — | — |
| (p) Dk. Burgundy | 0.088 | 0.244 | — | — | 5.365 | 0.0009 | — |
| (q) Hydrangea Blue | 1.81 | 1.81 | — | — | 0.571 | — | — |

EXAMPLE 1

Example 1 is illustrative of the procedure employed to prepare an evenly coated, smooth surface article using the Model 10L hand spray gun. A 4.5"×4.5" (~11.4×11.4 cm) tile of precursor glass was preheated to 100° C. and transferred to a spindle where it could be rotated at 80 rpm while being held in a horizontal position. The spray gun was positioned 16" (~40.6 cm) from the tile and at a 45° angle to it. 70 ml of aqueous slip containing frit of Glass 2 from Table I with color (g) from Table II and 7.7 grams of sugar were delivered from a graduated cylinder, thereby allowing close control of the volume delivered. During application the spray gun was moved in a sweeping motion across the plate at a pressure of 60 lbs/in² (~4.2 kg/cm². The rate of spray from the gun was 13-15 ml/minute. As soon as all the slip had been sprayed, the tile was moved into an oven operating at 100° C. and allowed to dry therein for 30 minutes. The tile was thereafter withdrawn from the oven and replaced on the spindle. 20 ml of aqueous slip containing colorless frit of Glass 2 of Table I and 2.2 grams of sugar were sprayed over the coated surface and dried in the oven. The total thickness of the two layers was about 0.004-0.006" (0.1-0.15 mm). The coated tile was then fired in an electrically-heated furnace to crystallize the glass in situ to a glass-ceramic and fuse the frit particles into a glaze coating in accordance with the following schedule:
Room temperature to 400° C. at a rate of 380° C./hour
400° C. to 790° C. at a rate of 390° C./hour
790° to 900° C. at a rate of 110° C./hour
900 to 940° C. at a rate of 40° C./hour
940°-1000° C. at a rate of 120° C./hour
Hold at 1000° C. for 1 to 2 hours
Cool at furnace rate Cooling at furnace rate involves cutting off the electric current and permitting the furnace to cool to room temperature with the tile remaining therein.

The glazed tile exhibited a solid blue aqua color with a slight -mottling and a thickness of 0.002-0.003" (0.05-0.08 mm).

EXAMPLE 2

Example 2 is representative of the procedure followed to produce a smooth coating on the base of a SUPREMA® 10.5" (~26.7 cm) diameter dinner plate with striations along the sloping sides thereof. In like manner to Example 1, the plate was preheated to 100° C. and thereafter transferred to a spindle for rotating at 80 rpm while being coated. 120 ml of aqueous slip of frit of Glass 2 of Table I with color (o) of Table II and 13.2 grams of sugar were delivered from a graduated cylinder and passed through the Model 10L hand spray onto the plate in like manner to Example 1 at a rate of 13-15 ml/minute. After oven drying at 100° C. for 30 minutes, 25 ml of aqueous slip containing colorless frit of Glass 2 of Table I and 2.8 grams of sugar were sprayed over the coated surface and oven dried at 100° C. The thickness of the combination dried coating was 0.008-0.010" (~0.2-0.25 mm). The frit was matured in an electrically-heated furnace in accordance with the following schedule:
Room temperature to 400° C. at a rate of 380° C./hour
400°-790° C. at a rate of 390° C./hour
790-900° C. at a rate of 110° C./hour
900-940° C. at a rate of 40° C./hour
940-970° C. at a rate of 120° C./hour
Hold for 1 to 2 hours
Cool at furnace rate The plate displayed a mottled appearance in the flat areas with a burgundy color and glaze thickness of 0.002-0.003" (0.05-0.08 mm). The relief areas exhibited darker colors where the glaze flowed down from the higher areas. Striations were developed on the sloping surface of the plate.

EXAMPLE 3

Example 3 illustrates the process for producing a granitic-texture utilizing the type MBC spatter gun. A 4.5×4.5" (~11.4×11.4 cm) glass-ceramic tile of the composition of SUPREMA® ware was preheated to 100° C. and transferred to a spindle where it was positioned vertically and not rotated. As was observed above, time and pressure of the spray are vital factors in texture production. The spatter gun was spaced 2.5-3'

($\sim$76.2–91.4 cm) from the tile and positioned at 90° thereto.

First, aqueous slip of frit of Glass 2 of Table I containing color (i) from Table II and 1.3 grams of sugar was spattered for 30 seconds onto the tile with the gun operating at 80 lbs/in$^2$ ($\sim$5.6 kg/cm$^2$) pressure. The tile was introduced into an oven operating at 100° C. and dried for 5 minutes.

Second, the coated tile was removed from the furnace and returned to the spindle. Aqueous slip of frit of Glass 2 of Table I containing color (a) from Table II and 1.8 grams of sugar was spattered for 40 seconds onto the coated tile with the gun again operating at 80 lbs/in$^2$ ($\sim$4.6 kg/cm$^2$) pressure. The tile was again moved into an oven and dried for 5 minutes at 100° C.

Third, aqueous slip of frit of Glass 2 of Table I containing color (i) from Table II and 1.3 grams of sugar was again spattered for 30 seconds onto the tile with the gun operating at 80 lbs/in$^2$ ($\sim$5.6 kg/cm$^2$) pressure. The tile was again dried for 5 minutes at 100° C.

Fourth, the dried tile was returned to the spindle and placed in a horizontal position where it could be rotated at 80 rpm. The Model 10L hand spray gun was set up as recited in Example 1 and 20 ml of aqueous slip containing colorless frit of Glass 2 of Table I and 2.2 grams of sugar was sprayed over the coated surface at a spray rate of 13–15 ml/minute and a pressure of 60 lbs/in$^2$ ($\sim$4.2 kg/cm$^2$). After drying, the total thickness of the four dried layers was 0.006–0.008" ($\sim$0.15–0.2 mm).

Thereafter, the frit was fused to a mature glaze utilizing the schedule set out above for Example 2 having a thickness of 0.003–0.004" ($\sim$0.08–0.1 mm). The tile exhibited a granitic texture consisting of small-to-medium spots ($\sim$0.5–5 mm in diameter) of gray and green, with green being the dominant color.

EXAMPLE 4

Example 4 illustrates a variation of the process for achieving a granitic texture to produce different effects. The same basic four steps described in Example 3 are employed except that the third spatter pressure was reduced from 80 to 40 lbs/in$^2$ ($\sim$5.6–2.8 kg/cm$^2$) to alter the resulting color spots. By decreasing the spatter pressure, the size of the color spots increased from about 5 mm to 8 mm.

The first spatter used frit of Glass 2 of Table I with color (i) of Table II and 1.3 grams of sugar. The second spatter used frit of Glass 2 of Table I with color (o) of Table II and 1.8 grams of sugar. The third spatter again used frit of Glass 2 of Table I with color (i) of Table II and 2.2 grams of sugar. The fourth, spray again used colorless frit of Glass 2 of Table I and 2.2 grams of sugar.

After firing the four layer coating of frit in accordance with the schedule set forth in Example 2, the glaze had a thickness of 0.003–0.004" ($\sim$0.08–0.1 mm). The tile displayed a granitic structure consisting of small-to-large spots (0.5–8 mm in diameter) of green and burgundy, with green being the dominant color.

EXAMPLE 5

Example 5 provides an illustration of a laminated glaze wherein a spatter coating is superimposed upon a spray coating. Thus, a 4.5×4.5" ($\sim$11.4×11.4 cm) glass-ceramic tile of the composition of SUPREMA® ware was first hand sprayed at 60 lbs/in$^2$ ($\sim$4.2 kg/cm$^2$) pressure with 100 ml of aqueous slip of frit of Glass 2 from Table I with color (n) from Table II and 10 grams of sugar in like manner to the description of Example 1. After drying, the tile was spattered for 40 seconds at 80 lbs/in$^2$ ($\sim$5.6 kg/cm$^2$) pounds with aqueous slip of frit of Glass 2 from Table I with color (a) from Table II and 1.8 grams of sugar. 20 ml aqueous slip of colorless frit of Glass 2 of Table I and 2.2 grams of sugar was sprayed over the coated surface at a spray rate of 13–15 ml/minute and a pressure of 60 lbs/cm$^2$ ($\sim$4.2 kg/cm$^2$).

The frit coating was matured to a glaze following the schedule set out above for Example 2; the glaze exhibiting a mottled gray and pink texture with pink constituting the dominant color.

EXAMPLE 6

Example 6 employed a four-step process similar to that of Example 4 except that aqueous slips of frit of Glass 2 of Table I with color (m) of Table II constituted the first spatter and third spatter and a slip of frit of Glass 2 of Table I with color (o) of Table II comprised the second spatter. The final spray again used colorless frit of Glass 2 of Table I.

After fusing the frit into an integral glaze coating following the firing schedule provided in Example 2, the tile exhibited a granitic texture with large spots of gold, due to the reduced pressure of the second gold spatter, accompanied with smaller spots of burgundy. Again, the resultant glaze had a thickness of about 0.003–0.004" ($\sim$0.08–0.01 mm).

EXAMPLE 7

Example 7 followed the four-step procedure of Example 6 except that aqueous slips of frit of Glass 2 of Table I with color (d) of Table II comprised the first and third spattered coatings and aqueous slip of frit of Glass 2 of Table II with color (a) of Table II comprised the second spattered coating. Yet again, the final spray used colorless frit of Glass 2 of Table I.

After maturing the frit into an integral glaze coating in accordance with the schedule set out in Example 2, the tile exhibited a granitic texture with an overall blue-gray appearance with large blue spots. Yet again, the final fired glaze had a thickness of about 0.003–0.004" ($\sim$0.08–0.010 mm).

EXAMPLE 8

Example 8 is illustrative of a procedure employed to prepare an evenly coated, smooth surface article using an aspirator-type sprayer. A SUPREMA® 6" ($\sim$15 cm) diameter plate was preheated to 100° C. and transferred to a spindle where it could be rotated at 80 rpm while in a horizontal position. The rim of the plate was masked with contact paper to permit the center portion only of the plate to be coated. The gun was positioned about 16" ($\sim$41 cm) from the plate and at an angle of 45° to it. 6 ml of aqueous slip containing frit of Glass 1 of Table I with color (d) of Table II and 0.33 gram of sugar were sprayed onto the plate at a rate of 6 ml/minute. After spraying, the masking paper was removed and the plate introduced into a drying oven and held therewithin for one hour at 100° C. to dry the slip. The plate was withdrawn from the furnace, returned to the spindle, and a rubber disc was placed over the center portion of the plate such that only the rim area of the plate was exposed. 2.5 ml of aqueous slip containing frit of Glass 1 of Table I with color (q) of Table II and 0.14 grams of sugar were sprayed onto the plate at a rate of 2.5 ml/minute. After spraying, the rubber disc was removed and the plate again introduced into a drying oven operating at 100° C. and maintained therewithin for one hour to dry the slip. The plate was withdrawn from the furnace and returned to the spindle. 10 ml of aqueous slip of colorless Glass I of Table I and 0.55 grams of sugar were sprayed over the entire plate at a rate of 6 ml/minute and that slip dried in the oven operating at 100° C. The total thickness of the layers of dried frit varied about 0.004-0.006" (~0.1-0.15 mm). The coated plate was thereafter fired in an electrically-heated furnace in accordance with the schedule used in Example 2.

The plate exhibited a smooth coating of solid color with the center portion being a medium blue and the rim being a dark blue. Both the center portion and rim displayed mottling. The thickness of the glaze coating was about 0.002-0.003" (~0.05-0.08 mm).

EXAMPLE 9

Example 9 is illustrative of a procedure followed to produce an evenly coated, smooth coating on the base of a SUPREMA ® 10.5" (~26 cm) diameter dinner plate using a slip of Glass 3 of Table I with color (e) of Table II and 13.2 grams of sugar. In like manner to Example 1, the plate was preheated to 100° C. and moved to a spindle where it would be rotated at 80 rpm while in a horizontal position. 120 ml of aqueous slip were delivered from a graduated cylinder and passed through the Model 10L hand spray gun onto the plate at a rate of 13-15 ml/minute. After oven drying for 30 minutes at 100° C., 25 ml of aqueous slip containing colorless frit of Glass 3 of Table I and 2.8 grams of sugar were sprayed over the coated surface and oven dried at 100° C. The thickness of the two layer dried coating was about 0.008-0.010" (~0.2-0.25 mm). The frit was matured into an integral glaze coating in an electrically-heated furnace in accordance with the schedule set forth in Example 2.

The plate displayed a mottled appearance in the flat areas of the plate with a blue color and a glaze thickness of about 0.002-0.003" (~0.05-0.08 mm). Light and dark blue striations were developed on the sloping sides thereof.

We claim:

1. A method for making a composite article consisting of a glass-ceramic body and an adherent colored glaze having a controlled texture comprising the steps of:
   (a) melting a batch for a first glass containing a desired colorant;
   (b) cooling said melt to a first glass body and comminuting said first glass body into finely-divided frit particles;
   (c) blending said frit particles of said first glass into a liquid vehicle to form a slip;
   (d) applying said slip of said frit particles of said first glass onto the surface of a glass-ceramic body or onto the surface of a precursor glass body to be crystallized into a glass-ceramic body and drying said slip to form a layer of said frit particles of said first glass on the surface of said body;
   (e) melting a batch for a second glass having essentially the same basic composition as said first glass, but being colorless or containing a colorant different from that in said first glass;
   (f) cooling said melt to a second glass body and comminuting said second glass body into finely-divided frit particles;
   (g) blending said frit particles of said second glass into a liquid vehicle to form a slip;
   (h) applying said slip of said frit particles of said second glass over the layer of frit particles of said first glass and drying said slip to form a layer of frit particles of said second glass atop the layer of frit particles of said first glass; and thereafter
   (i) firing said two layers of frit particles at a temperature and for a time sufficient to fuse said frit particles of said two layers into an integral glaze coating.

2. A method according to claim 1 wherein said colorant is present in an amount of about 1-7% by weight total and is selected from the group consisting of $Co_3O_4$, $Cr_2O_3$, $CuO$, $Fe_2O_3$, $MnO_2$, $V_2O_5$, selenium, and rare earth metal oxides.

3. A method according to claim 1 wherein water comprises the liquid vehicle in Steps (c) and (g).

4. A method according to claim 1 wherein said slips are applied through spraying.

5. A method according to claim 1 wherein the thickness of each layer of dried frit particles is about 0.004-0.010" (~0.1-0.25 mm).

6. A method according to claim 4 wherein said slips are sprayed at pressures of about 50-100 lbs/in² (~3.5-7.0 kg/cm²).

7. A method according to claim 6 wherein said first glass contains a colorant and said second glass is colorless to produce a glaze exhibiting a mottled texture.

8. A method according to claim 6 wherein at least one of said slips is spattered at pressures of about 70-100 lbs/in² (~4.9-7.0 kg/cm²) to produce a glaze exhibiting a granite-like texture.

9. A method according to claim 6 wherein said slips are sprayed at pressures of about 50-70 lbs/in² (~3.5-4.9 kg/cm²) to produce glazes exhibiting smooth, evenly coated surfaces.

10. A method according to claim 1 wherein the thickness of said integral glaze coating is about 0.002-0.005" (~0.05-0.13 mm).

11. A method according to claim 1 wherein another slip of frit particles of said first frit glass is applied atop the layer of frit particles of said second glass, dried to form a third layer of frit particles, and thereafter the three layers of frit particles are fired to fuse said frit particles into an integral glaze coating.

12. A method according to claim 1 wherein said first and second glasses have base compositions consisting essentially, expressed in terms of weight percent on the oxide basis, of

| $SiO_2$ | 46-50 | $K_2O$ | 1-2 |
| --- | --- | --- | --- |
| $Al_2O_3$ | 5-8 | $CaO$ | 1-4 |
| $ZrO_2$ | 0.3-1 | $ZnO$ | 2-6 |
| $Li_2O$ | 1-2 | $SrO$ | 2-6 |
| $Na_2O$ | 2-3.5 | $B_2O_3$ | 9-11. |
| $PbO$ | 20-25 | | |

13. A method according to claim 1 wherein said first and second glasses are free from lead and cadmium and have base compositions consisting essentially, expressed in terms of mole percent on the oxide basis, of

| $SiO_2$ | 55-75 | $Na_2O$ | 3-9 |
| --- | --- | --- | --- |
| $B_2O_3$ | 8-13 | $ZrO_2$ | 2-5 |
| $Al_2O_3$ | 0.5-3 | $BaO$ | 0.5-16 | with, optionally, up to 12% total of an oxide selected from the group in the indicated proportions of 0-5% K₂O, 0-10% Li₂O, 0-2% MgO, 0-5% CaO, 0-3% SrO, and 0-2% ZnO.

14. A method according to claim 1 wherein said first and second glasses are free from lead and cadmium and have base compositions consisting essentially, expressed in terms of weight percent on the oxide basis, of

| SiO₂ | 51-59 | CaO | 0-7 |
|---|---|---|---|
| Li₂O | 0-2 | SrO | 0-12 |
| Na₂O | 3.5-7 | BaO | 0-9 |
| K₂O | 6-8.5 | ZnO | 0-10 |
| Li₂O + Na₂O + K₂O | 10-15 | CaO + SrO + BaO + ZnO | 9-18 |
| B₂O₃ | 9-12 | | |
| | | Al₂O₃ | 4.5-7 | with the proviso that the mole ratio (Li₂O+Na₂O+K₂O):—(CaO+SrO+BaO+ZnO) is greater than 1.0 and ranges up to about 1.4.

15. A method according to claim 1 wherein said glass-ceramic body contains potassium fluorrichterite as the predominant crystal phase with the sometime presence of canasite as a secondary crystal phase and consists essentially, expressed in terms of weight percent on the oxide basis, of

| SiO₂ | 50-70 | Na₂O | 2-9 |
|---|---|---|---|
| CaO | 4-15 | K₂O | 2-12 |
| MgO | 8-25 | Li₂O | 0-3 |
| F | 3-8 | Al₂O₃ | 0-7 |

16. A method according to claim 1 wherein said glass-ceramic body contains potassium fluorrichterite as the predominant crystal phase, but also contains at least 10% by volume cristobalite, and consists essentially, expressed in terms of weight percent on the oxide basis, of

| SiO₂ | 65-69 | Na₂O | 1.5-3.3 |
|---|---|---|---|
| Al₂O₃ | 0.75-3 | K₂O | 4.2-6.0 |
| MgO | 13.5-17.5 | BaO | 0-2.5 |
| CaO | 3-4.8 | P₂O₅ | 0-2.5 |
| Li₂O | 0.5-2.0 | F | 3.3-5.5 |

17. A method according to claim 1 wherein said layers of frit particles are fired at a temperature of about 900°-1000° C. to fuse said frit particles into an integral glaze coating.

18. A method according to claim 17 wherein said layers of frit particles are fired for at least one hour.

19. A method according to claim 1 wherein said slips are applied to the surface of a precursor glass body to be crystallized into a glass-ceramic body such that, upon firing said layers of frit particles into a glaze coating, said precursor glass body is crystallized into a glass-ceramic body.

* * * * *